United States Patent [19]
Brinkley

[11] Patent Number: 5,810,378
[45] Date of Patent: Sep. 22, 1998

[54] COLLAPSIBLE CARGO TRAILER

[76] Inventor: Robert S. Brinkley, 919 Brooks, Ann Arbor, Mich. 48103

[21] Appl. No.: 645,866

[22] Filed: May 14, 1996

[51] Int. Cl.$^6$ .................................................. B62K 27/00
[52] U.S. Cl. ........................................... 280/204; 280/645
[58] Field of Search .................................... 280/47.18, 63, 280/202, 204, 292, 641, 644, 645, 656

[56] References Cited

U.S. PATENT DOCUMENTS

| | | | |
|---|---|---|---|
| 2,546,604 | 3/1951 | Lafky | 280/645 |
| 2,732,572 | 1/1956 | Dunham | 280/645 |
| 2,839,310 | 6/1958 | Livingston et al. | 280/645 |
| 3,860,254 | 1/1975 | Wegener | 280/652 |
| 4,362,308 | 12/1982 | Hicks et al. | 280/645 |
| 4,371,184 | 2/1983 | Henden et al. | 280/204 |
| 4,958,846 | 9/1990 | Greenberg | 280/652 |
| 5,020,814 | 6/1991 | George et al. | 280/204 |
| 5,454,577 | 10/1995 | Bell | 280/204 |
| 5,474,316 | 12/1995 | Britton | 280/204 |
| 5,577,746 | 11/1996 | Britton | 280/204 |

*Primary Examiner*—Randolph A. Reese
*Assistant Examiner*—John L. Beres
*Attorney, Agent, or Firm*—Donald P. Gillette

[57] ABSTRACT

A collapsible trailer to be towed by a bicycle has front and rear U-shaped members pivotally mounted on an axle to the ends of which wheels can be attached. The front and rear portions of front and rear floor panels pivotally mounted on the axle are suspended from the front and rear U-shaped members, respectively, by tension members when the trailer is open for use but can be pivoted toward each other when the trailer is collapsed. A forward extension of the front U-shaped member can be connected to a bicycle so the trailer can be towed. Foldable front, side, and rear panels, which can enclose or be attached to or comprise the tension members, combine with the floor panels to form the body of the trailer.

24 Claims, 5 Drawing Sheets

COLLAPSIBLE CARGO TRAILER

BACKGROUND OF THE INVENTION

1. Field of the Invention

This invention relates to the field of trailers suitable to be towed by bicycles and, when not being so used, to be folded up-to be carried by hand and stowed in a small space.

2. The Prior Art

U.S. Pat. No. 5,356,197 to Simic discloses a trailer that can be towed behind a bicycle and can be folded in several ways to form a chair, a dolly, or a table. It can also be collapsed into a generally flat structure to be stored in a small space. However, Simic's trailer is not arranged to carry cargo and does not have tension means to suspend sections of a floor from frame members and to limit the pivotal movement of those frame members away from each other.

Young, in U.S. Pat. No. 5,072,958, shows a hand truck that has wheels mounted on pivotal supports so that they can be pivoted either to be parallel to each other when the hand truck is transporting a load or to be in line with each other when the hand truck is to be stowed away. As in Simic's trailer, Young's hand truck has no tension means to suspend sections of a floor from frame members and to limit the pivotal movement of those frame members away from each other.

U.S. Pat. No. 5,320,371 to Levad shows a trailer to support an elongated load, such as a canoe or ladder or the like and to be towed behind a bicycle. Like Simic's trailer and Young's hand truck, Levad's trailer has no tension means to suspend sections of a floor from frame members and to limit the pivotal movement of those frame members away from each other.

George et al. disclose a collapsible baby-carrying trailer that can be towed behind a bicycle, but like the preceding patents, has no tension means to suspend sections of a floor from frame members and to limit the pivotal movement of those frame members away from each other.

Cervantes shows a foldable bicycle cart that merely provides a base on which cargo may be placed. It does not include frame members defining a cargo space and joined together by tension means that limits their pivotal movement away from each other and allows other cargo-carrying means to be suspended from the frame members.

U.S. Pat. Nos. 4,759,559 to Moulton, 4,448,434 to Anderson, and 4,371,184 to Henden et al. show hand trucks that can be collapsed to allow them to be stowed in minimum spaces. Neither one includes frame members defining a cargo space and joined together by tension means that limits their pivotal movement away from each other and allows other cargo-carrying means to be suspended from the frame members.

U.S. Pat. Nos. 4,037,853 to Sparks, 3,829,125 to Davis, and 3,792,875 to Paden show cargo carriers to be towed behind bicycles, but, like the foregoing patents, none has frame members defining a cargo space and joined together by tension means that limit their pivotal movement away from each other and allow other cargo-carrying means to be suspended from the frame members.

German De 3202881 also shows a collapsible bicycle trailer but without tension means that limit their pivotal movement away from each other and allow other cargo-carrying means to be suspended from the frame members.

French Patent Publication shows a device that can be removably attached to a bicycle to serve as a bicycle trainer.

None of the prior structures shows a bicycle trailer that can be collapsed into a minimum space for storage and is light enough to be hand-carried and has frame members joined together by tension means that minimize the weight of the trailer but retain its strength as a load-carrying device.

OBJECTS AND SUMMARY OF THE INVENTION

It is an object of this invention to provide a collapsible trailer having pivotally mounted frame members interconnected by tension means so that, when the trailer is expanded, it can carry a substantial amount of cargo while being towed behind a two-wheeled vehicle and, when collapsed, can be stowed in a space much smaller than the trailer occupies when expanded.

Those who are skilled in the technology with which this invention deals will recognize further objects after studying the following description.

In accordance with this invention the trailer comprises an axle that has first and second end portions aligned on a common axis and a body supported on the central part of the axle between the end portions. Wheels are mounted on the end portions to support the body clear of the ground.

The body includes a cargo floor comprising a forward portion, a rear portion, and hinge means connecting the forward and rear portions to the central portion of the axle to allow the forward and rear portions to pivot toward each other when the trailer is being collapsed. The body also includes a first and second generally U-shaped frame members, each comprising side arms that extend generally parallel to each other and are pivotally connected, respectively, to the first and second end portions of the axle to allow the frame members to pivot toward each other about the common axis to collapse the trailer and away from each other to expand it to carry cargo.

The body further includes flexible tension means connecting the first frame member and to the front edge of the forward portion of the cargo floor to suspend the front edge of the forward portion of the cargo floor from the first frame member and the second frame member and to the rear edge of the rear portion of the cargo floor to suspend the rear edge of the rear portion of the cargo floor from the second frame member and connecting the first and second frame members to each other to limit the extent to which they can pivot away from each other. The trailer also includes towing connection means connected to the first frame member to attach the trailer to a two-wheeled vehicle.

The invention will be described in greater detail in connection with the drawings, in which like serial numbers in different figures indicate the same item.

DETAILED DESCRIPTION OF A PREFERRED EMBODIMENT

Figure 1:
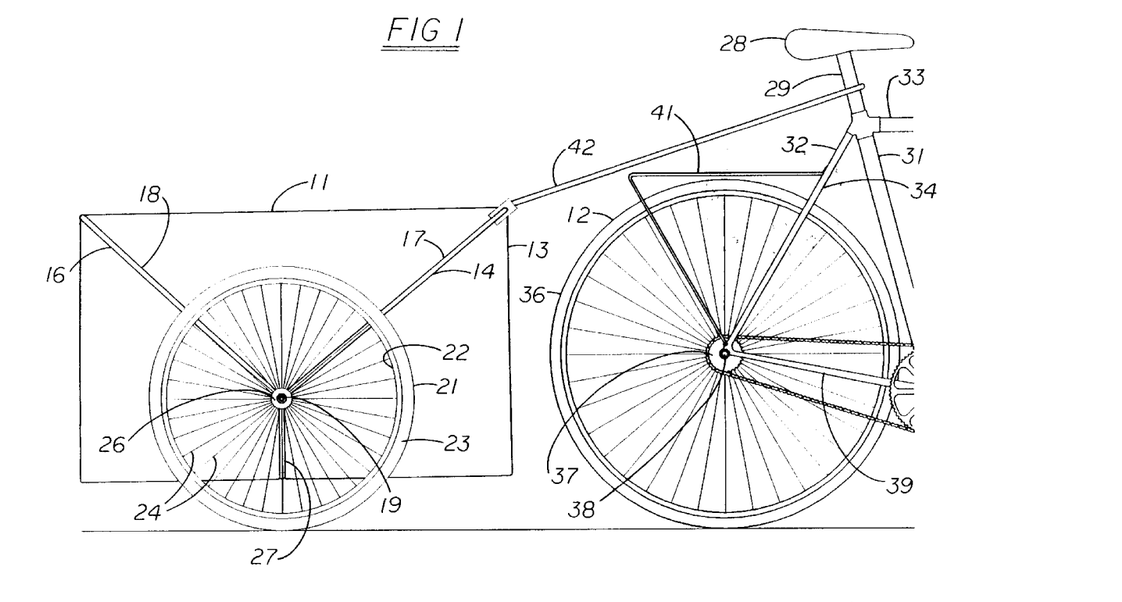
FIG. 1 is a side view of a trailer according to this invention connected to a bicycle to be towed by it.

FIG. 1 shows a trailer 11 connected to a bicycle 12 to be towed by it. In accordance with this invention, the trailer includes a body 13 with first and second frame members 14 and 16, of which only side arms 17 and 18 are visible in this figure. Both arms are directed toward an axle 19 for a wheel 21, which is one of a pair of wheels that support the body. The wheel is a typical bicycle-type wheel with a rim 22, an inflatable tire 23 mounted on the rim, and a large number of spokes 24 extending from a hub 26 to the rim. However, this is not the only configuration of wheel that would be suitable for the trailer 11. In this embodiment, the frame members and the axle are made of solid aluminum rods approximately 1 cm. in diameter, although hollow rods and other materials could be used, instead.

The side arms converge on what is really only an end portion of the axle 19. The axle also includes a vertically offset central portion, which is not shown in this figure but is joined to the end portion by a vertical section 27 the length of which is shown in this figure as being at least half as great as the radius of the wheels 11 but not substantially greater than ⅔ the radius of the wheels.

The only part of the bicycle 12 shown in FIG. 1 is the rear part, including a saddle 28 mounted on a seatpost 29, which is typically telescopically inserted in the upper end of a seat tube 31 that constitutes part of the frame 32 of the bicycle. Other parts of the frame shown in this figure include a small part of a top tube 33, a pair of seat stays that extend downwardly and to the rear of the intersection of the seat tube and the top tube. Only one seat stay 34 is visible in this figure, the other one being directly behind it and behind the rear wheel 36, the hub 37 of which is held in a dropout 38 and a second dropout directly behind it and on the other side of the rear wheel. The dropouts are fixedly held by a pair of chain stays, one of which, identified by reference numeral 39 is visible and the other of which is hidden directly behind it and behind the wheel 36 in this view. The hub of the wheel is held by the dropouts.

In this embodiment, the bicycle has a rack 41 attached to the seat stays to be rigidly positioned directly over the rear wheel 36.

The wheel 36 is similar to the wheel 21, except that, in this embodiment, it has a larger diameter, which is determined, in part, by the speed at which the bicycle is expected to be pedaled and the effort expected to be exerted in attaining that speed. All that is required of the wheel 21 is that it not be so small as to affect adversely the progress of the bicycle and trailer. The wheel 21 should also not be so large as to form an unwieldy package when the trailer 11 is collapsed to be hand-carried or stowed away.

The trailer 11 is attached to the bicycle 12 by a towing member 42, the rear end of which is attached to the front end of the frame member 14 and the front end of which extends around the seatpost 29 to serve as towing connection means for the trailer. It will be noted that, in this embodiment, the towing member does not extend in the same direction as the side arm 17 but is at a small angle to that direction. This is to allow the towing member 42 to clear the rack 41 and anything carried on that rack. Such clearance must be maintained not only when that bicycle 12 and the trailer 11 are proceeding in a straight line but also when they are turning, at which time the bicycle will be tilted over but the trailer will not. However, a rack is not always mounted on a bicycle, and, in that case, the towing member can be in the same plane as the side arm 17.

Figure 2:
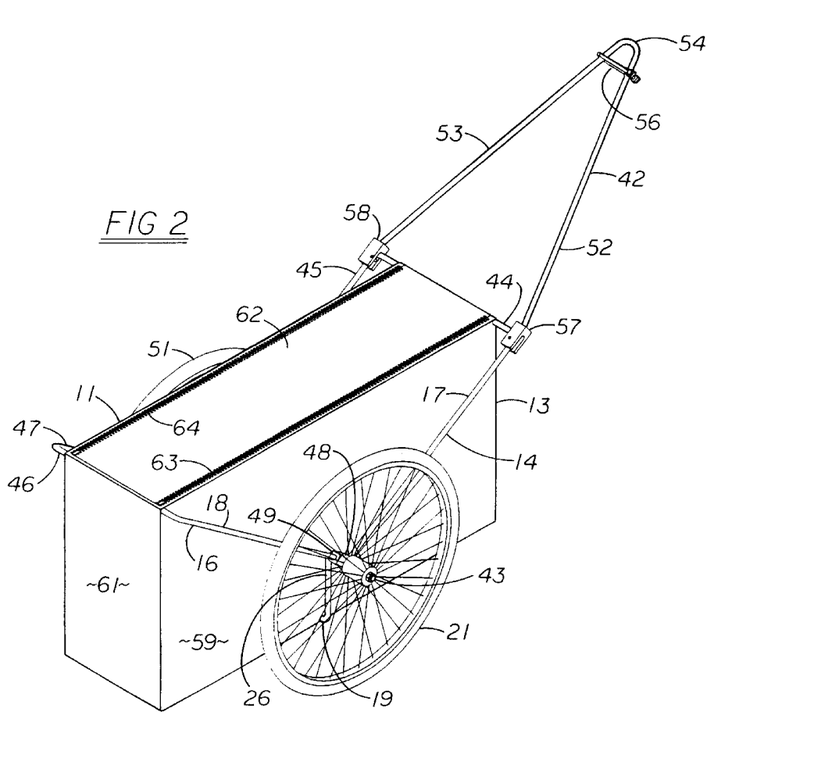
FIG. 2 is a perspective view of the trailer in FIG. 1.

FIG. 2 shows the trailer 11, alone, and from a point of view above and to the rear of the trailer. In this view, the axle 19 is shown as including an end portion 43 on which the wheel 21 is rotatable mounted at the upper end of the vertical section 27. It can also be seen that the axle bends at the lower end of the vertical section 27 to pass under the body 13.

FIG. 2 also shows that the front frame member 14 has a generally u-shaped configuration and, in addition to the side arm 17, includes a bight 44 that joins the upper end of the side arm 17 to a second side arm 45 on the other side of the body 13. In a similar manner, the side arm 18 of the rear frame member 16 is joined by a bight 46 to a second side arm 47. The side arms 17 and 18 have journal members 48 and 49, respectively, affixed to the lower ends of these side arms and pivotally mounted on the end portion 43 of the axle to allow the side arms 17 and 18 to pivot about the end portion 43 of the axle.

A small part of a second wheel 51 is visible on the far side of the body 13 and is mounted on an axle portion collinear with the end portion 43 of the wheel 21.

The towing member 42 is shown in FIG. 2 as a generally V-shaped member having elongated, relatively straight first and second sides 52 and 53 angularly disposed with respect to each other and joined together at one end by a bight 54 of generally circular configuration having a radius greater than the radius of a typical bicycle seatpost 29 to allow the towing member 42 to be placed over the saddle 28. Forward movement of the bicycle (or slight rearward movement of the trailer 11) will draw the bight 54 against the seatpost, which it loosely encompasses. The radius of the bight 54 is so much larger than that of the seatpost that there is little or no binding and wear of the towing member on the seatpost 29. Any potential wear can be minimized by placing a soft plastic sleeve over the bight portion of the towing member 42.

FIG. 2 also shows a locking member 56 that can be fastened to the towing member after the latter has been placed on the seatpost 29 to prevent the towing member 42 from being lifted over the saddle 28 in order to steal the trailer 11 and prevent forward motion of the trailer relative to the bicycle 12.

The rear ends of the sides 52 and 53 are rigidly joined to a pair of slotted blocks 57 and 58 fitted onto the forward frame member 14 at the respective intersections of the side arms 17 and 45 with the bight 44. These blocks allow the towing member to be pivoted about the bight 44 in collapsing the trailer, and they also serve to hold the towing member in a fixed position relative to the frame member 14 when the trailer is being towed. The towing rods 52 and 53 extend from the hinge means 57 and 58 in a plane at an angle between about 170° and 180° relative to the plane of the first and second side arms to clear any bicycle structure behind the seatpost.

The body 13 comprises four walls of which only one side wall 59 and the rear wall 61 are visible. By making the side walls and the front and rear walls of a suitable flexible material, such as canvas, they can be folded easily in collapsing the trailer into a compact package. The trailer 11 also has a top 62, which is preferably also made of canvas to be easily folded up, held closed by zipper closure means 63 and 64 running fore and aft along the edges near where the side walls intersect the top wall. The end of the top at its junction with the rear wall 61 can be sewn thereto to keep the top from being separated from the rest of the body 13. For better protection from the weather of items carried in the body 13, the side edges of the top 62 can be extended over the zippers along the sides and over the bight 46. Of course, the top could be joined to the body 13 at the front rather than at the rear.

Figure 3:
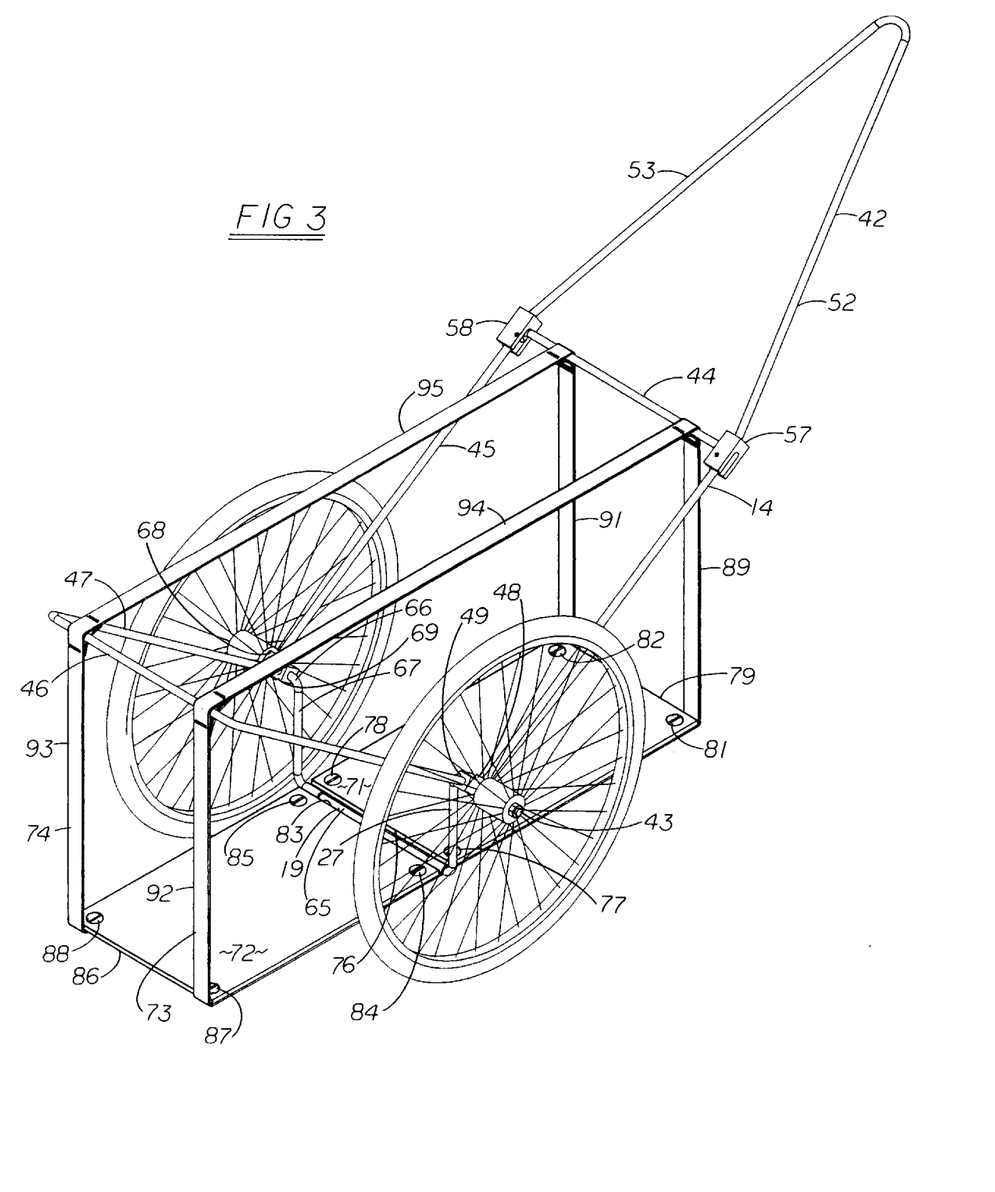
FIG. 3 is a perspective view of the frame and some of the other components of the trailer in FIG. 2.

FIG. 3 shows the structural components of the trailer 11 without the walls and cover shown in FIG. 2. In FIG. 3, the whole axle 19 is visible, including the end portion 43 and the vertical section 27, a central part 65, an end portion 66 matching the end portion 43, and a vertical section 67 matching the vertical section 27. Journal members 68 and 69 similar to the members 48 and 49 rigidly attached to the lower ends of the side arm 45 and 47 are visible in this figure to allow the latter side arms to pivot about the end portion 66 of the axle 19.

The body 13 has a pair of rigid inner bottom panels 71 and 72, which are supported on tension means consisting of two straps 73 and 74 of a strong, flexible material, such as nylon, in this embodiment. The rear edge 76 of the front panel is attached to the straps 73 and 74 by machine screws 77 and 78, respectively, and the front edge 79 of that panel is attached to the straps by another pair of machine screws 81 and 82. The front edge 83 of the rear panel 72 is attached to the straps 73 and 74 by another pair of machine screws 84 and 85, respectively, and the rear edge 86 of the rear panel is attached to the straps 73 and 74 by yet another pair of machine screws 87 and 88.

While this suggests that each of the straps is endless, they can, in fact, be cut into shorter lengths. The parts 89 and 91 of the straps 73 and 74 serve as first flexible tension means each firmly attached to a respective opposite end of the front edge 79 of the forward section 71 of the floor and to a respective opposite end of the first central bight 44 adjacent the first and second side arms to suspend the front part of the forward section from the front frame member 14 and, in particular, from the bight 44. The parts 92 and 93 serve as second flexible tension means each firmly attached to a respective opposite end of the rear edge 86 to suspend the rear part of the rear panel 72 from the bight 46. The parts 94 and 95 limit the distance that the front frame member 14, and, in particular, the bight 44, can pivot away from the rear frame member 16, and, in particular, the bight 46. Finally, the short length 96 of the strap 73 between the screws 77 and 84 and the short length 97 of the strap 74 between the screws 78 and 85 serve as hinge means to allow the front and rear panels to pivot relative to each other about the central part 65 of the axle between the vertical portions 27 and 67.

Figure 4:
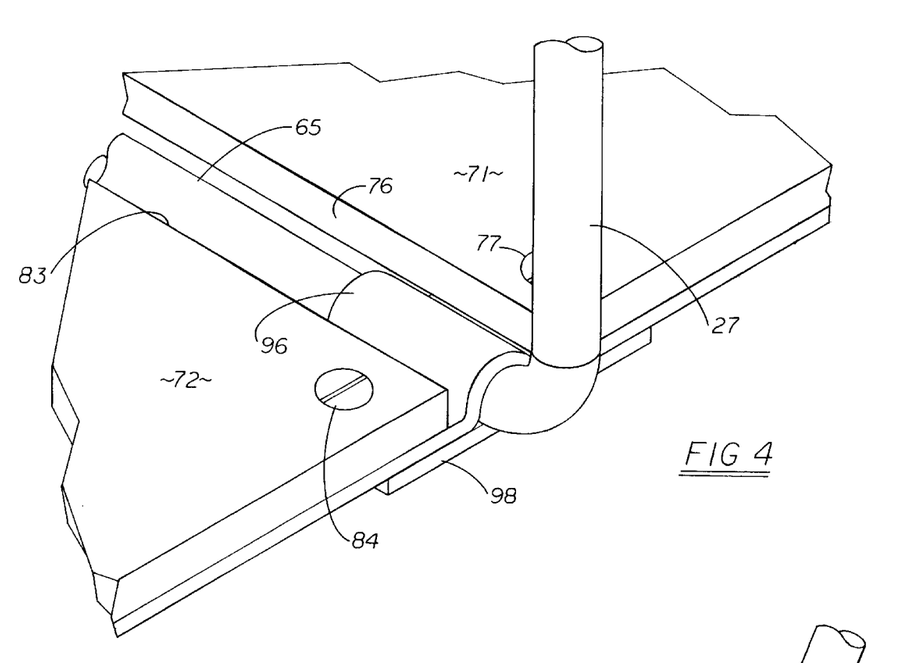
FIG. 4 is a perspective, enlarged view of a fragment of the floor and floor hinge arrangement of the trailer in FIG. 3.
Figure 5:
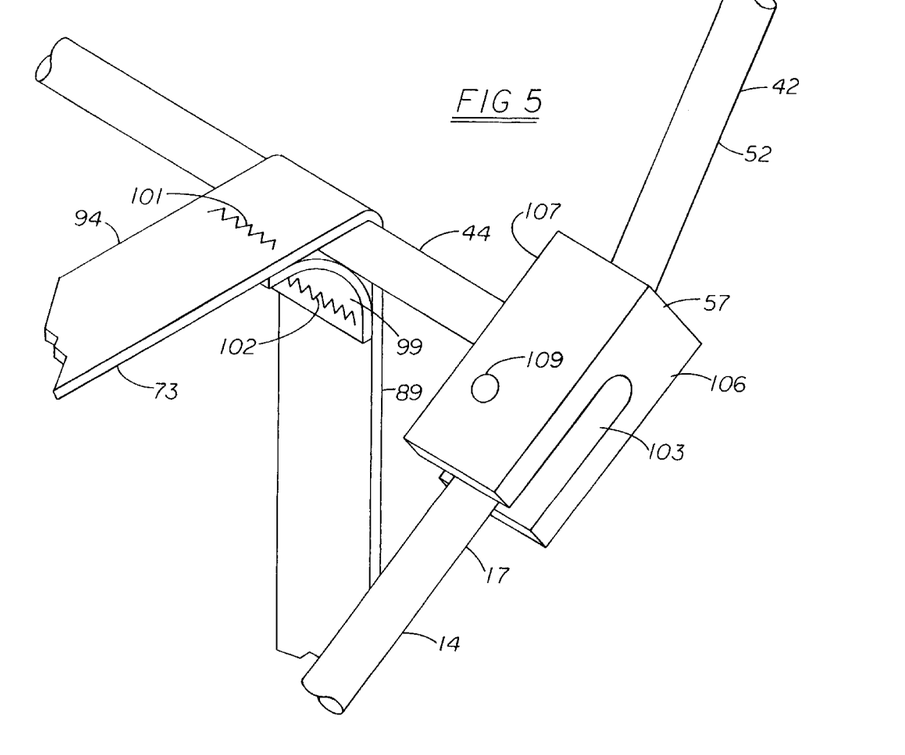
FIG. 5 is a perspective, enlarged view of fragments of the frame structure of FIG. 3.

FIGS. 4 and 5 show enlarged views of portions of the strap 73 to illustrate the way it is attached to the bight 44 and the central part 65 of the axle 19. In each instance, a short piece of similar strap material is sewn to the strap 73 to encircle the respective rod. In FIG. 4, a piece of strap 98 may be sewn to the strap 73 on each side of the axle 65, although, instead of sewing these components together, the strap 98 may be affixed to the strap 73 by the machine screws 77 and 84. In either case, the short strap length 96 and the short strap 98 encircle the axle 19 and hold the rear edge 76 of the front panel 71 and the front edge 83 of the rear panel 72 close to the axle to pivot about it. In FIG. 5, a piece of strap 99 is attached to the strap 73 by seams 101 and 102 at the junction between the parts 89 and 94 so that the bight 44 cannot slip away from that part of the strap 73.

Figures 6, 7:
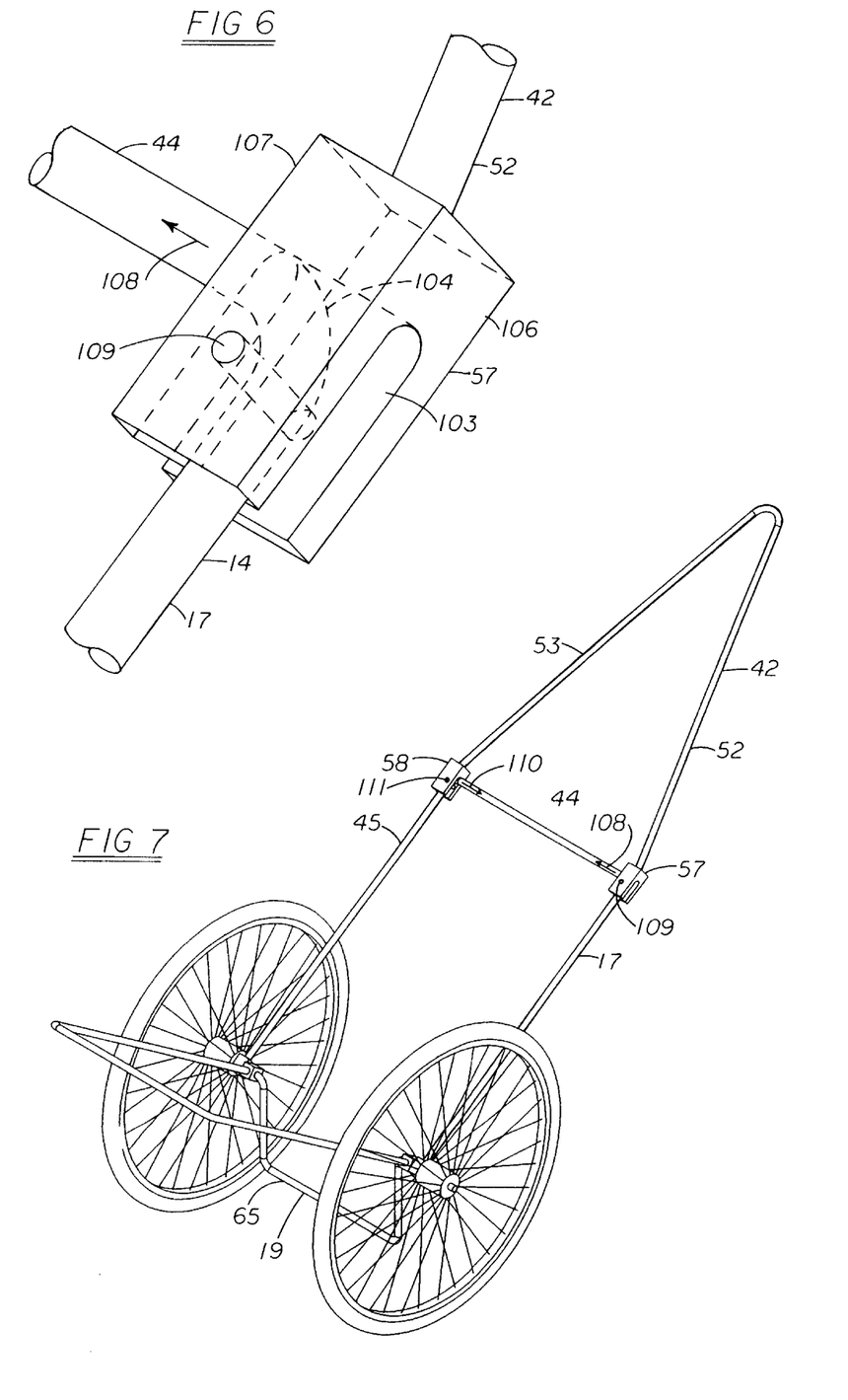
FIG. 6 is perspective view of components for holding the towing member extended or allowing it to fold toward the main part of the trailer.
FIG. 7 is perspective view of the frame and wheels of the trailer in FIG. 3 without any of the body components.

FIGS. 5 and 6 show the slotted block 57 in greater detail. The block has a central slot 103 that is just wide enough to receive the rod that forms the side arm 17, the bight 44 and an elbow 104 that joins them together. In this embodiment, the slot extends across the full width of the block from side 106 to side 107, and the block can slide in the direction indicated by an arrow 108. A blocking member, which, in this embodiment, is a pin 109 through the block, projects into the path of the elbow or the side arm 17 to prevent the block from sliding out of engagement with the frame member 14. When the block is slid far enough in the direction of the arrow 108 to be clear of the elbow 104, the block 57 and the side 52 of the towing member 42 attached to the block can be pivoted around the bight 44 as part of the manipulation in collapsing the trailer as compactly as possible.

FIG. 7 shows just the frame members and wheels of the trailer 11. In order to allow the towing member 42 to be pivoted around the bight 44, the resilience of the rod material of which the towing member is formed must be overcome. This requires that the blocks 57 and 58 be pushed in the directions of the arrows 108 and 110, respectively, against the resilient towing member 42 to clear the blocks of the side arms 17 and 45. Once the blocks are clear of the side arms 17 and 45, the towing member 42 can be pivoted in either direction around the bight.

Figures 8, 9:
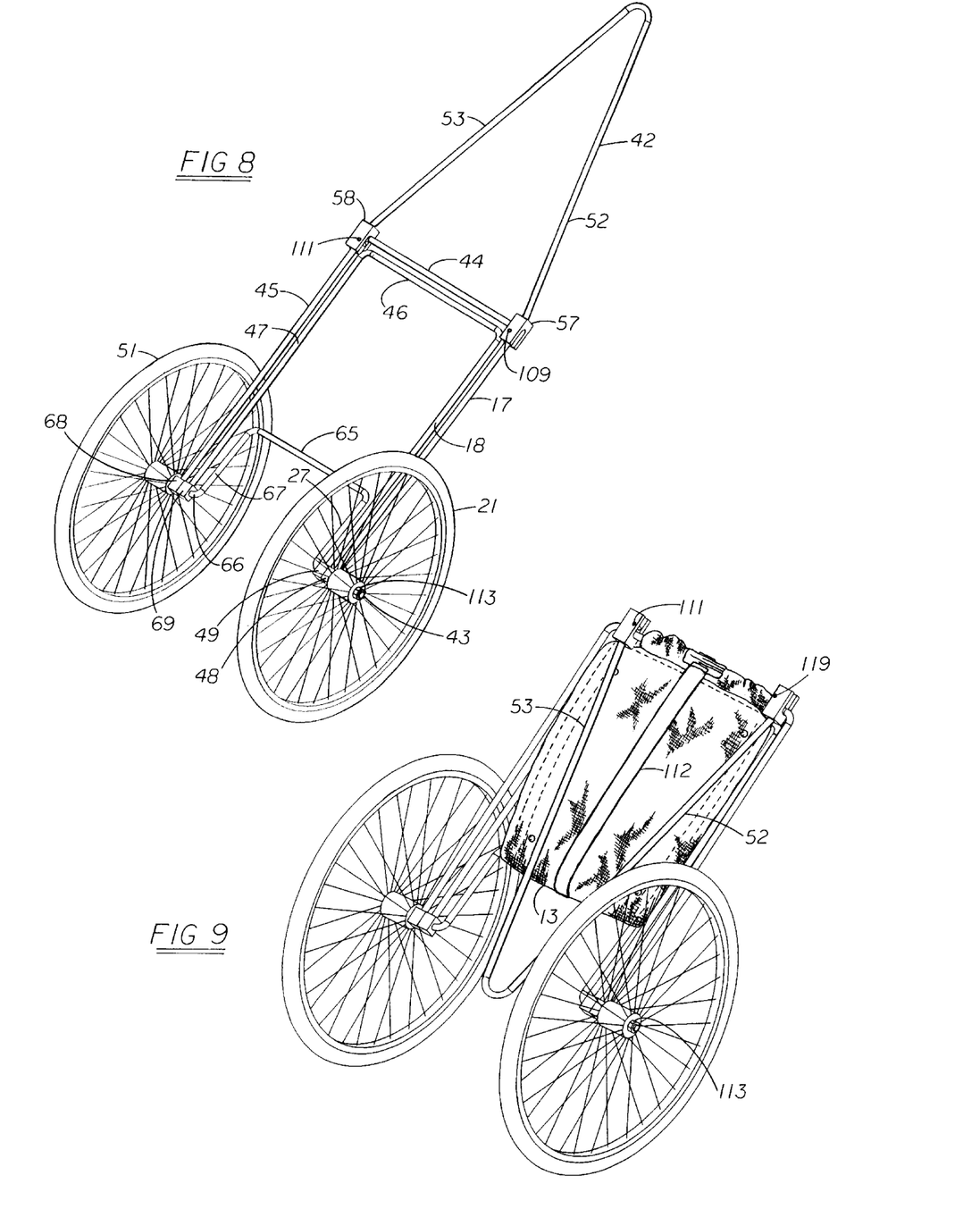
FIG. 8 shows the frame in FIG. 7 partially folded up.
FIG. 9 shows the frame fully folded and having the body folded with it.

FIG. 8 shows the rear frame member 16 folded forward to be coplanar with the front frame member 14. This requires that the bight 46 be shorter than the bight 44 to clear the blocks 57 and 58 and that the journal members 48 and 69 be between the journal members 48 and 68 and the vertical sections 27 and 67, respectively. As shown in this figure, the distance from the common axis of the end portions 43 and 66 to the second transverse central bight 46 is less than distance from the common axis of the end portions 43 and 66 to the first transverse central bight 44 by an amount not substantially greater than the thickness of the frame members, and the length of the second central bight 46 is less than the length of the first central bight 44 by an amount not substantially greater than the thickness of the frame members. This allows the frame members to be pivoted relative to each other about the common axis to place the frame members in a common plane. It also requires that the side arms 18 and 47 be enough shorter than the side arms 17 and 45 not to interfere with the blocks 57 and 58 or the pins 109 and 111 in those blocks. It should also be noted that, in collapsing the frame of the trailer, the axle 19 is pivoted in all four of the journal members so that the offset central portion 65 is co-planar with the side arms 17, 18, 45, and 47.

FIG. 9 shows the body 13 on the frame and the frame folded as in FIG. 8. In addition, the towing member 42 is also shown folded over the body 13. The whole structure is held in this position by a strap 112 buckled around the central part of the body. The trailer 11 can be collapsed one step farther by removing the wheels 21 and 51 from the end portions 43 and 66 and holding one wheel on the main surface of the body 13 visible in this figure and the other on the obverse surface by means of a strap or a bungee cord. in order to facilitate removal and reattachment of the wheels, they are both held on the respective end portions 43 and 66 by easily removable nuts threaded on the end portions. Only one of the nuts 113 is visible in these drawings, and it is illustrated as a hex nut, although wing nuts may be used instead for easier removal and reattachment.

The invention has been described in terms of a specific embodiment, but it will be apparent to those skilled in the technology with which this invention deals that the concept may be embodied in other forms without departing from the true scope of the invention.

What is claimed is:

1. A collapsible cargo trailer to be towed by a two-wheeled vehicle, said trailer comprising:
   (a) a transverse axle comprising:
      (i) first and second end portions aligned on a common axis, and
      (ii) a central portion;
   (b) a pair of wheels mounted on the end portions, the radius of the wheels being greater than the offset distance;
   (c) a cargo floor extending fore and aft from the central portion of the axle and comprising:
      (i) a forward portion having front and rear edges,
      (ii) a rear portion having front and rear edges, and
      (iii) hinge means connecting the rear edge of the forward portion and the front edge of the rear portion to the central portion of the axle to allow the forward and rear portions of the cargo floor to pivot toward each other;
   (d) a first generally U-shaped, forward, frame member comprising:
      (i) a first transverse central bight, and
      (ii) first and second side arms extending generally parallel to each other from opposite ends of the central bight, the side arms being co-planar and pivotally connected, respectively, to the first and second end portions of the axle to allow the first frame member to pivot about the common axis;
   (e) a second generally U-shaped, rear, frame member comprising:
      (i) a second transverse central bight, and
      (ii) third and fourth side arms extending from opposite ends of the second central bight, respectively, the third and fourth side arms being co-planar and pivotally connected, respectively, to the first and second end portions of the axle to allow the second frame member to pivot about the common axis;
   (f) first flexible, tension means connected to the first frame member and the front edge of the forward portion of the cargo floor to suspend the front edge of the forward portion of the cargo floor from the first frame member;
   (g) second flexible, tension means connected to the second frame member and the rear edge of the rear portion of the cargo floor to suspend the rear edge of the rear portion of the cargo floor from the second frame member;
   (h) third flexible, tension means connected to the first and second frame members to limit the extent to which the first frame member can pivot forward relative to the common axis and the extent to which the second frame member can pivot to the rear relative to the common axis; and
   (i) towing connection means connected to the first frame member to attach the trailer to a two-wheeled vehicle.

2. The collapsible cargo trailer of claim 1 in which the central portion of the axle is straight and is offset parallel to the end portions and the offset distance is at least half as great as the radius of the wheels.

3. The collapsible cargo trailer of claim 2 in which the offset distance is not substantially greater than ⅔ the radius of the wheels.

4. The collapsible cargo trailer of claim 1 in which the forward and rear portions of the cargo floor comprise rigid plates.

5. The collapsible cargo trailer of claim 1 in which the flexible, tension means comprises straps.

6. The collapsible cargo trailer of claim 1 in which the first flexible tension means comprise first and second forward straps, each firmly attached to a respective opposite end of the front edge of the forward section of the floor and to a respective opposite end of the first central bight adjacent the first and second side arms.

7. The collapsible cargo trailer of claim 1 in which the second flexible tension means comprise third and fourth rear straps, each firmly attached to a respective opposite end of the rear edge of the rear section of the floor and to a respective opposite end of the second central bight adjacent the third and fourth side arms.

8. The collapsible cargo trailer of claim 1 in which the third flexible tension means comprise a fifth side strap firmly attached to the first and second central bights adjacent the first and second side arms and a sixth side strap attached to the first and second central bights adjacent the second and fourth side arms, respectively, to limit the extent that the first central bight can pivot away from the second central bight.

9. The collapsible cargo trailer means of claim 1 in which the flexible tension means comprise:
   (a) a first strap firmly attached to one end of the front edge of the forward section of the floor and to one end of the rear edge of the rear section of the floor and is joined to the first central bight adjacent the first side arm and to the second central bight adjacent the second side arm; and
   (b) a second strap firmly attached to a second end of the front edge of the forward section of the floor and to a second end of the rear edge of the rear section of the floor and is joined to the first central bight adjacent the second side arm and to the second central bight adjacent the fourth side arm.

10. The collapsible cargo trailer means of claim 9 comprising, in addition:
    (a) first and second short strap sections joined to the first and second straps, respectively, to encircle the first central bight; and
    b) third and fourth short strap sections joined to the first and second straps, respectively, to encircle the second central bight.

11. The collapsible cargo trailer of claim 10 in which the hinge means comprises:
    (a) short portions of the flexible means joining the forward and rear portions of the cargo floor to each other and to the central portion of the axle; and
    (b) third and fourth short strap sections joined to the first and second straps, respectively, to encircle the central portion of the axle.

12. The collapsible cargo trailer means of claim 10 in which each of the first and second straps has a length between the point at which it is joined to the first and second central bights is substantially equal to the overall length of the cargo floor from the front edge of the forward portion to the rear edge of the rear portion.

13. The collapsible cargo trailer means of claim 10 in which:
    (a) the length of the first strap from the forward edge of the forward section of the floor to the first central bight is substantially equal to the length of the first strap from the rear edge of the rear section of the floor to the second central bight; and
    (b) the length of the second strap from the forward edge of the forward section of the floor to the first central bight is substantially equal to the length of the second strap from the rear edge of the rear section of the floor to the second central bight.

14. The collapsible cargo trailer of claim 1 in which:
(a) the frame members are rods having a predetermined thickness;
(b) the distance from the common axis to the second transverse central bight is less than distance from the common axis to the first transverse central bight by an amount not substantially greater than the thickness of the frame members; and
(c) the length of the second central bight is less than the length of the first central bight by an amount not substantially greater than the thickness of the frame members, whereby the frame members can be pivoted relative to each other about the common axis to place the frame members in a common plane.

15. The collapsible cargo trailer of claim 1 in which the frame members are formed of round, aluminum rods having a predetermined diameter.

16. The collapsible cargo trailer of claim 15 for a vehicle having a seatpost with a saddle mounted on it and in which the towing connection comprises a generally V-shaped member having elongated first and second sides angularly disposed with respect to each other and joined together at one end to be placed over the saddle and encompassing the seatpost, the other ends of the two elongated sides being spaced apart by a distance substantially equal to the distance between the ends of the first central bight and being connected to the respective ends of the first central bight by first and second latchable hinge means, whereby the towing connection can be pivoted substantially 180° relative to the first central bight from a collapsed position substantially between the first and second side arms to an extended position in which the one end of the V-shaped member points away from the first and second side arms.

17. The collapsible cargo trailer of claim 16 in which the latchable hinge means comprise:
(a) a first hinge member mounted on said other end of one of the sides;
(b) a second hinge member mounted on said other end of the other of the sides, each of the hinge members having a slot wide enough to receive the first central bight together with an adjacent part of the first and second side arms, the slot being deep enough to extend along the respective first and second side arms to prevent rotation of the towing connection about the central bight when a portion of the first and second side arms is embraced within the slots of the respective first and second hinge members, each of the hinge members further having a barrier to hold the respective hinge member longitudinally slidably along the central bight away from the respective side arms to allow rotation of the towing connection about the central bight.

18. A collapsible cargo trailer to be towed by a bicycle that has a seatpost and saddle mounted thereon, said trailer comprising:
(a) a transverse axle comprising:
(i) first and second end portions aligned on a common axis, and
(ii) a central portion offset from the end portions;
(b) a cargo floor comprising:
(i) a forward portion having front and rear edges,
(ii) a rear portion having front and rear edges, and
(iii) hinge means connecting the rear edge of the forward portion and the front edge of the rear portion to the central portion of the axle to allow the forward and rear portions of the cargo floor to pivot toward each other;
(c) a first generally U-shaped, forward, frame member comprising:
(i) a first transverse central bight, and
(ii) first and second side arms extending generally parallel to each other from opposite ends of the central bight, the side arms being pivotally connected, respectively, to the first and second end portions of the axle to allow the first frame member to pivot about the common axis;
(d) a second generally U-shaped, rear, frame member comprising:
(i) a second transverse central bight, and
(ii) third and fourth side arms extending generally parallel to each other from opposite ends of the second central bight, the third and fourth side arms being pivotally connected, respectively, to the first and second end portions of the axle to allow the second frame member to pivot about the common axis;
(e) first flexible, tension means connected to the first frame member and the front edge of the forward portion of the cargo floor to suspend the front edge of the forward portion of the cargo floor from the first frame member;
(f) second flexible, tension means connected to the second frame member and the rear edge of the rear portion of the cargo floor to suspend the rear edge of the rear portion of the cargo floor from the second frame member;
(g) third flexible, tension means connected to the first and second frame members to limit the extent to which the first frame member can pivot forward relative to the common axis and the extent to which the second frame member can pivot to the rear relative to the common axis;
(h) towing connection means connected to the first frame member to attach the trailer to a two-wheeled vehicle; and
(i) a flexible container supported by the first and second frame members between the side arms thereof and attached to the cargo floor.

19. The collapsible cargo trailer of claim 18 comprising:
(a) a flexible forward end panel extending from the front edge of the front section of the floor to the first central bight and attached thereto;
(b) a flexible rear end panel extending from the rear edge of the rear section of the floor to the second central bight and attached thereto;
(c) first and second side panels, each having a lower edge attached to the floor and an upper edge extending up from the floor approximately as far as the central bights.

20. A cargo trailer collapsible to a compact package to be carried by hand and expandable to carry cargo and be towed by a bicycle, said trailer comprising:
(a) a container comprising:
(i) a floor extending in a longitudinal fore and aft direction and comprising front and rear portions hinged together to pivot about a hinge axis perpendicular to the longitudinal direction in a central region of the floor, the front and rear portions being pivoted toward each other to collapse the trailer and away from each other to expand the trailer to a towable condition;
(ii) a flexible perimeter wall comprising front end, rear end and side panels extending upwardly a predetermined distance from the perimeter of the floor and joined to the floor;

(b) a pair of wheels having a certain radius;

(c) a pair of wheel axles external to the container and on opposite sides thereof and having a common axis generally parallel to the hinge axis, the common axis being above the hinge axis by a distance less than the wheel radius when the trailer is expanded to be towed;

(d) a generally U-shaped first frame member comprising:
   (i) a transverse central bight, and
   (ii) first and second side arms, each joined at one end thereof to a respective end of the bight and connected to a respective one of the axles;

(e) a generally U-shaped second frame member comprising:
   (i) a transverse central bight, and
   (ii) third and fourth side arms, each joined at one end thereof to a respective end of the bight and connected to a respective one of the axles;

(f) pivotal means connecting the first and second side arms to the third and fourth side arms, respectively, whereby the first and second frame members can pivot relative to each other, the front end panel being connected to the bight of the first frame member to suspend the front portion of the floor, and the rear end panel being connected to the bight of the second frame member to suspend the rear portion of the floor, the side panels comprising means to limit the maximum extent that the first and second frame members can pivot away from each other when the trailer is expanded to a towable condition.

21. The cargo trailer of claim 20 comprising, in addition, a flexible cover attached to one of the end panels and extendable over the container and comprising means to attach the cover to the side panels and the other end panel.

22. The cargo trailer of claim 21 in which the means to attach the cover to the side panels and the other end panel comprise zipper means.

23. The cargo trailer of claim 20 comprising, in addition, towing means to attach the trailer to a bicycle seatpost, said towing means comprising:

(a) first and second towing rods joined together at one end to embrace the seatpost; and (b) a pair of latchable hinge means attached to the other end of the towing rods, respectively, to the first bight between the first and second side arms and the front end panel, each of the hinge means being slidable along the first bight into engagement with the first and second side arms, respectively, to latch the towing rods in a towing position extending from the hinge means substantially in the same plane as the first and second side arms and away from the container, each of the hinge means also being slidable out of engagement with the first and second side arms to allow the towing rods to pivot about the first bight to a collapsed position to allow the trailer to be folded to a compact package to be carried by hand.

24. The cargo trailer of claim 23 in which the towing rods extend from the hinge means in a plane at an angle between about 170° and 180° relative to the plane of the first and second side arms to clear any bicycle structure behind the seatpost.

* * * * *